(12) United States Patent
Wang et al.

(10) Patent No.: US 8,001,121 B2
(45) Date of Patent: Aug. 16, 2011

(54) TRAINING A RANKING FUNCTION USING PROPAGATED DOCUMENT RELEVANCE

(75) Inventors: Jue Wang, Beijing (CN); Mingjing Li, Beijing (CN); Wei-Ying Ma, Beijing (CN); Zhiwei Li, Beijing (CN)

(73) Assignee: Microsoft Corporation, Redmond, WA (US)

( * ) Notice: Subject to any disclaimer, the term of this patent is extended or adjusted under 35 U.S.C. 154(b) by 606 days.

(21) Appl. No.: 11/364,576

(22) Filed: Feb. 27, 2006

(65) Prior Publication Data

US 2007/0203908 A1 Aug. 30, 2007

(51) Int. Cl.
*G06F 17/30* (2006.01)
(52) U.S. Cl. ......... 707/736; 707/706; 707/713; 707/737
(58) Field of Classification Search .............. 707/7, 706, 707/713, 736, 737
See application file for complete search history.

(56) References Cited

U.S. PATENT DOCUMENTS

| | | | |
|---|---|---|---|
| 5,418,951 A | | 5/1995 | Damashek |
| 5,619,709 A | * | 4/1997 | Caid et al. ...................... 715/209 |
| 5,649,193 A | * | 7/1997 | Sumita et al. ............. 707/103 R |
| 5,724,567 A | * | 3/1998 | Rose et al. .......................... 707/2 |
| 5,768,578 A | * | 6/1998 | Kirk et al. ...................... 707/100 |
| 5,897,639 A | * | 4/1999 | Greef et al. ............... 707/103 R |
| 6,182,091 B1 | * | 1/2001 | Pitkow et al. .................. 715/206 |
| 6,272,507 B1 | * | 8/2001 | Pirolli et al. ................... 715/206 |
| 6,286,018 B1 | * | 9/2001 | Pitkow et al. .................. 715/206 |
| 6,314,420 B1 | * | 11/2001 | Lang et al. .......................... 707/3 |
| 6,463,433 B1 | * | 10/2002 | Baclawski .......................... 707/5 |
| 6,691,108 B2 | * | 2/2004 | Li ....................................... 707/3 |
| 6,738,678 B1 | * | 5/2004 | Bharat et al. ..................... 700/48 |
| 7,024,418 B1 | * | 4/2006 | Childress ...................... 707/102 |
| 7,143,091 B2 | | 11/2006 | Charnock et al. |
| 7,281,005 B2 | * | 10/2007 | Canright et al. ................... 707/5 |
| 7,305,389 B2 | * | 12/2007 | Zeng et al. ......................... 707/5 |
| 2002/0049705 A1 | * | 4/2002 | Haviv-Segal et al. ............. 707/1 |
| 2004/0098362 A1 | | 5/2004 | Gargi |
| 2004/0133566 A1 | * | 7/2004 | Ishiguro et al. ................... 707/3 |
| 2005/0102251 A1 | * | 5/2005 | Gillespie ............................ 707/1 |
| 2006/0004753 A1 | | 1/2006 | Coifman et al. |

OTHER PUBLICATIONS

"Silk from a Sow's Ear: Extracting Usable Structures from the Web", by Prolli et al., published 1996, pp. 1-14.*
U.S. Appl. No. 11/364,807, filed Feb. 27, 2006, Wang et al.
Brinker, Klaus, "Active Learning of Label Ranking Functions," Appearing in Proceedings of the 21st International Conference on Machine Learning, Canada, 2004, 8 pages.
Burges, Chris et al., "Learning to Rank using Gradient Descent," Appearing in Proceedings of the 22nd International Conference on Machine Learning, Germany, 2005, 8 pages.

(Continued)

*Primary Examiner* — William L Bashore
*Assistant Examiner* — Gregory A Distefano
(74) *Attorney, Agent, or Firm* — Perkins Coie LLP

(57) ABSTRACT

A method and system for propagating the relevance of labeled documents to a query to unlabeled documents is provided. The propagation system provides training data that includes queries, documents labeled with their relevance to the queries, and unlabeled documents. The propagation system then calculates the similarity between pairs of documents in the training data. The propagation system then propagates the relevance of the labeled documents to similar, but unlabeled, documents. The propagation system may iteratively propagate labels of the documents until the labels converge on a solution. The training data with the propagated relevances can then be used to train a ranking function.

18 Claims, 8 Drawing Sheets

OTHER PUBLICATIONS

Cohen, William W., "Learning to Order Things," Published May 1999, Journal of Artificial Intelligence Research, vol. 10, 1999, © 1999 AI Access Foundation and Morgan Kaufmann Publishers, pp. 243-270.

Crammer, Koby and Yoram Singer, "Pranking with Ranking," NIPS 2002, 7 pages.

Freund, Yoav et al., "An Efficient Boosting Algorithm for Combining Preferences," Published Nov. 2003, 2003 Journal of Machine Learning Research, vol. 4, pp. 933-969.

Harman, Donna, "Overview of the Third Text Retrieval Conference (TREC-3)," NIST Special Publication 500-226, 1995, 19 pages.

Harrington, Edward F., "Online Ranking/Collaborative Filtering using the Perceptron Algorithm," Proceedings of the 20th International Conference on Machine Learning (ICML-2003), Washington DC, 2003, 8 pages.

He, Jingrui et al., "Manifold-Ranking Based Image Retrieval," MM'04, Oct., New York, © 2004 ACM, 8 pages.

Herbrich, Ralf, Thore Graepel and Klaus Obermayer, "Large Margin Rank Boundaries for Ordinal Regression," Smola, Bartlett, Scholkopf, and Schuurmans: Advances in Large Margin Classifiers, Mar. 26, 2000, MIT Press, pp. 115-132.

Inoue, Kohei and Kiichi Urahama, "Recognition and Retrieval of Face Images by Semi-supervised Learning," PCM 2004, © 2004 Springer-Verlag Berlin Heidelberg, pp. 561-568.

Jarvelin, Kalervo and Jaana Kekalainen, "IR evaluation methods for retrieving highly relevant documents," SIGIR 2000, Athens, Greece, © 2000 ACM, pp. 41-48.

Pass, Greg, Ramin Zabih and Justin Miller, "Comparing Images Using Color Coherence Vectors," 14th ACM International Conference on Multimedia, 1997, pp. 1-14.

Shi, Jianbo and Jitendra Malik, "Normalized Cuts and Image Segmentation," Nov. 16, 1999, IEEE Transactions on Pattern Analysis and Machine Intelligence, vol. 22, No. 8, Aug. 2000, © 2000 IEEE, pp. 888-905.

Stricker, Markus and Markus Orengo, "Similarity of Color Images," Storage and Retrieval for Image and Video Databases, Proceedings of SPIE 1995, San Jose, California, pp. 1-12.

Zhou, Dengyong et al., "Learning with Local and Global Consistency," NIPS 2003, 8 pages.

Zhou, Dengyong et al., "Ranking on Data Manifolds," NIPS 2003, 8 pages.

PCT International Search Report, Aug. 14, 2007, PCT/US2007/005149.

Qin, Tao et al., A Study of Relevance Propagation for Web Search, SIGIR'05, Aug. 15-19, 2005, Salvador, Brazil, © 2005 ACM, pp. 408-415.

Shakery, Azadeh and ChengXiang Zhai, "Relevance Propagation for Topic Distillation UIUC TREC-2003 Web Track Experiments," NIST Special Publication 500-255: The Twelfth Text Retrieval Conference, Gaithersburg, Maryland, 2003.

Wang, Xin-Jing et al., "Multi-Model Similarity Propagation and its Application for Web Image Retrieval," ACM Multimedia'04, Oct. 10-16, 2004, New York, NY, © 2004 ACM, pp. 944-951.

Supplementary European Search Report; European Application No. 07751873, Mailed on Feb. 18, 2010.

Supplementary European Search Report; European Patent Application No. 07751881, Mailed on Feb. 18, 2010.

Jing, Feng, et al., "Keyword Propagation for Image Retrieval," IEEE Symposium on Circuits and Systems, 2004, vol. 2, pp. 53-56.

Burges, Christopher, "Ranking as learning structured outputs," Proceedings of the NIPS 2005 Workshop on Learning, 4 pages.

Trotman, Andrew, "Learning to Rank," Information Retrieval, Kluwer Academic Publishers, BO, vol. 8, No. 3, Jan. 1, 2005, pp. 359-381.

* cited by examiner

TRAINING A RANKING FUNCTION USING PROPAGATED DOCUMENT RELEVANCE

BACKGROUND

Once the relevances are propagated, the propagation labeled system may use the training data sets (query and labeled feature vectors) to train a ranking function. A ranking function may be implemented as a Bayes net algorithm, a support vector machine, an adaptive boosting classifier, a neural network classifier, and so on. A support vector machine operates by finding a hyper-surface in the space of possible inputs. The hyper-surface attempts to split the positive examples from the negative examples by maximizing the distance between the nearest of the positive and negative examples to the hyper-surface. This allows for correct classification of data that is similar to but not identical to the training data. Various techniques can be used to train a support vector machine. One technique uses a sequential minimal optimization algorithm that breaks the large quadratic programming problem down into a series of small quadratic programming problems that can be solved analytically. (See Sequential Minimal Optimization, at Microsoft's research web site at "~jplatt/smo.html.")

Three well-known techniques for ranking of web pages are PageRank, HITS ("Hyperlinked-Induced Topic Search"), and DirectHIT. PageRank is based on the principle that web pages will have links to (i.e., "outgoing links") important web pages. Thus, the importance of a web page is based on the number and importance of other web pages that link to that web page (i.e., "incoming links"). In a simple form, the links between web pages can be represented by adjacency matrix A, where $A_{ij}$ represents the number of outgoing links from web page i to web page j. The importance score $w_j$ for web page j can be represented by the following equation:

$$w_j = \sum_i A_{ij} w_i$$

This equation can be solved by iterative calculations based on the following equation:

$$A^T w = w$$

where w is the vector of importance scores for the web pages and is the principal eigenvector of $A^T$.

The HITS technique is additionally based on the principle that a web page that has many links to other important web pages may itself be important. Thus, HITS divides "importance" of web pages into two related attributes: "hub" and "authority." "Hub" is measured by the "authority" score of the web pages that a web page links to, and "authority" is measured by the "hub" score of the web pages that link to the web page. In contrast to PageRank, which calculates the importance of web pages independently from the query, HITS calculates importance based on the web pages of the result and web pages that are related to the web pages of the result by following incoming and outgoing links. HITS submits a query to a search engine service and uses the web pages of the result as the initial set of web pages. HITS adds to the set those web pages that are the destinations of incoming links and those web pages that are the sources of outgoing links of the web pages of the result. HITS then calculates the authority and hub score of each web page using an iterative algorithm. The authority and hub scores can be represented by the following equations:

$$a(p) = \sum_{q \to p} h(q) \text{ and } h(p) = \sum_{p \to q} a(q)$$

where a(p) represents the authority score for web page p and h(p) represents the hub score for web page p. HITS uses an adjacency matrix A to represent the links. The adjacency matrix is represented by the following equation:

$$b_{ij} = \begin{cases} 1 & \text{if page } i \text{ has a link to page } j, \\ 0 & \text{otherwise} \end{cases}$$

The vectors a and h correspond to the authority and hub scores, respectively, of all web pages in the set and can be represented by the following equations:

$$a = A^T h \text{ and } h = Aa$$

Thus, a and h are eigenvectors of matrices $A^T A$ and $AA^T$. HITS may also be modified to factor in the popularity of a web page as measured by the number of visits. Based on an analysis of click-through data, $b_{ij}$ of the adjacency matrix can be increased whenever a user travels from web page i to web page j.

DirectHIT ranks web pages based on past user history with results of similar queries. For example, if users who submit similar queries typically first selected the third web page of the result, then this user history would be an indication that the third web page should be ranked higher. As another example, if users who submit similar queries typically spend the most time viewing the fourth web page of the result, then this user history would be an indication that the fourth web page should be ranked higher. DirectHIT derives the user histories from analysis of click-through data.

Some ranking techniques use machine learning algorithms to learn a ranking function from training data that includes queries, feature vectors representing pages, and for each query, a ranking for each page. A ranking function serves as a mapping from features of a page to its rank for a given query. The learning of a ranking function has been considered by some as a regression problem for learning the mapping of a feature vector to a member of an ordered set of numerical ranks. Some regression based techniques attempt to provide an absolute relevance score that can be used to rank pages. A ranking function, however, need not provide an absolute relevance score but rather need only provide a relative ranking of the pages. Thus, these regression-based techniques solve a problem that is more difficult than needed.

Machine learning algorithms for a ranking function use queries, feature vectors, and user-labeled relevance scores as training data. To generate the training data, queries may be submitted to a search engine which generates the pages of the search result. The algorithms then generate the feature vectors for the pages and input from a user the relevance scores for each page. A difficulty with such an approach is that a search engine may return hundreds of pages as its search result. It can be quite costly to have a user label all the pages of a search result. Moreover, it can be difficult for a user to accurately assess the relevance of such a large number of pages. Although a user could label only a small portion of the pages, the learning based on such a small portion may not provide an accurate ranking function.

SUMMARY

A method and system for propagating the relevance of labeled documents to a query to the relevance of unlabeled documents is provided. The propagation system provides training data that includes queries, documents labeled with their relevance to the queries, and unlabeled documents. The propagation system then calculates the similarity between pairs of documents in the training data. The propagation system then propagates the relevance of the labeled documents to similar, but unlabeled, documents. The propagation system may iteratively propagate labels of the documents until the labels converge on a solution. The training data with the propagated relevances can then be used to train a ranking function.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
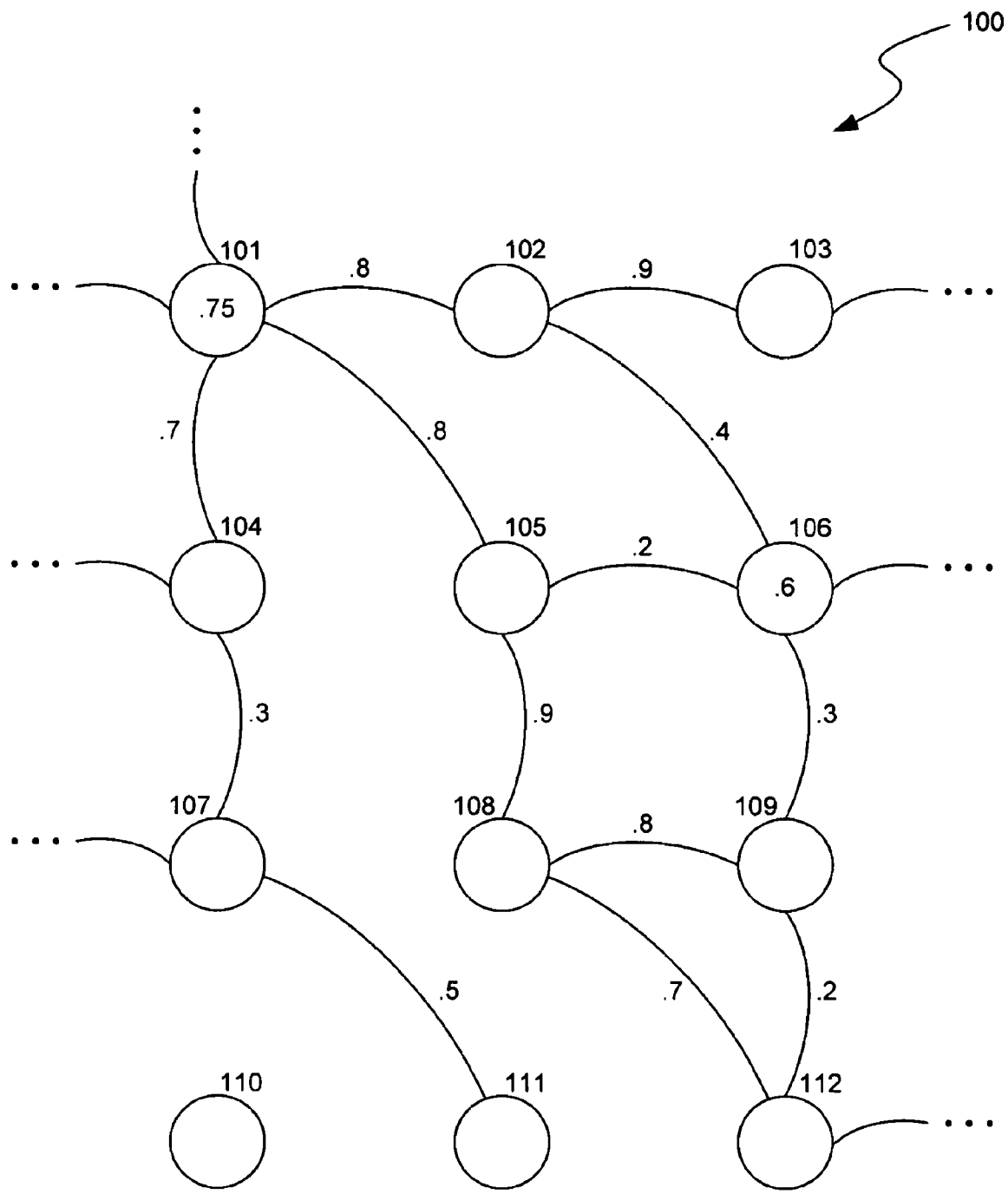
FIG. 1 is a diagram that illustrates a portion of a graph of documents.

A method and system for propagating relevance of labeled documents to a query to unlabeled documents is provided. In one embodiment, the propagation system provides training data that includes queries, documents (represented by feature vectors) labeled with their relevance to the queries, and unlabeled documents. For example, the propagation system may submit a query to a search engine and use the search result as the documents (e.g., web pages). The propagation system may then prompt a user to label some of the documents of the search result based on their relevance to the query. The propagation system then calculates the similarity between pairs of documents in the training data. For example, the propagation system may represent each document by a feature vector and may calculate the similarity between documents based on the Euclidean distance in feature space or based on a cosine similarity metric. The propagation system then propagates the relevance of the labeled documents to similar, but unlabeled, documents. The propagation system may iteratively propagate labels of the documents until the labels converge on a solution. The training data with the propagated relevances can then be used to train a ranking function. In this way, the propagation system can automatically augment training data with additional training data based on similarities between documents.

In one embodiment, the propagation system represents the documents using a document graph with each node representing a document and each edge representing similarity between the documents represented by the connected nodes. The propagation system may represent the graph as a square matrix with a row and column for each document in which each non-zero value indicates an edge between the node of the row and the node of the column. The propagation system may define edges for the graph using various techniques. For example, the propagation system may consider the graph to be fully connected in which case each node has an edge to every other node. As another example, the propagation system may consider the nodes to be connected via a minimum spanning tree. In one embodiment, the propagation system considers the nodes to be connected using a k-nearest neighbor algorithm. In particular, the propagation system identifies the k nearest neighbors to each node and adds an edge from that node to each of its k nearest neighbors. The propagation system then calculates weights for the edges based on the similarity between the documents represented by the connected edges. The propagation system may use various techniques for determining the similarity between documents. In one embodiment, the propagation system uses a Euclidean distance metric based on the feature vector representation of the documents in a feature space. The propagation system stores the similarity as the values of the square matrix resulting in a similarity or affinity matrix. The propagation system may also normalize the similarity matrix. The propagation system may also set the diagonal values to 0 to prevent self-reinforcement during relevance propagation.

After generating the similarity matrix, the propagation system propagates the relevance of the labeled documents to the unlabeled documents using a manifold ranking based propagation algorithm. A manifold ranking based algorithm is described in He, J., Li, M., Zhang, H. J., et al., "Manifold-Ranking Based Image Retrieval," Proc. of the $12^{th}$ Annual ACM International Conf. on Multimedia, 2004, which is hereby incorporated by reference. The propagation system initially sets the relevance of the labeled documents to the relevance score provided by the user and the relevance of the unlabeled documents to 0. The propagation system then spreads the relevance of the labeled documents to their connected unlabeled documents factoring in the similarity as indicated by the similarity matrix. The propagation system iteratively spreads the relevance score until the relevance scores converge on a solution. The resulting relevance scores of the unlabeled documents will be in proportion to the probability that they are relevant to the same query as the labeled documents. An unlabeled document that is very similar to many labeled documents with high relevance scores will thus have a high relevance score. Conversely, an unlabeled document that is not very similar to any labeled documents will have a low relevance score.

The propagation system may represent similarity using a Laplace kernel, which can be represented by the following equation:

$$k_L(x_i, x_j) = \prod_{l=1}^{t} \frac{1}{2\sigma_l} \exp(-|x_{il} - x_{jl}|/\sigma_l) \quad (1)$$

where $x_{il}$ and $x_{jl}$ represent the $l^{th}$ dimension of $x_i$ and $x_j$ respectively, t represents the dimensionality of the feature space, and $\sigma_l$ represents a positive parameter that reflects the weights of different dimensions in the similarity calculation. Thus, the propagation system represents the weight of the edges by the following equation:

$$W_{ij} = k_L(x_i, x_j) = \prod_{l=1}^{t} \exp(-|x_{il} - x_{jl}|/\sigma_l) \quad (2)$$

where $w_{ij}$ represents the similarity between documents i and j. The propagation system may omit the constant coefficient $\frac{1}{2}\sigma_l$ since its effect on the similarity matrix W will be counteracted by the normalization of the matrix. The propagation system normalizes the similarity matrix as represented by the following equation:

$$S = D^{-1/2} W D^{-1/2} \quad (3)$$

where S represents the normalized similarity matrix and D represents a diagonal matrix where (i,i) is equal to the sum of the ith row of similarity matrix W. The normalization normalizes the similarities to be relative to the similarity of the connected documents.

The propagation system may represent each document as a t dimension feature vector x that forms a point in the Euclidian space. For a query, the propagation system receives the result set of documents $\chi = \{x_{l1}, x_{l2}, \ldots x_{lm}, x_{u1}, x_{u2}, \ldots x_{um}\} \subset \mathbb{R}^t$. The first m points (in feature space) represent user-labeled documents, and the last n points (in feature space) represent unlabeled documents. The propagation system also receives a corresponding label vector $\gamma = [y_{l1}, y_{l2}, \ldots, y_{lm}, 0, 0, \ldots, 0]^T$. The last n labels have the value of 0 to represent unlabeled documents. The propagation system may also allow for the specification of negative labels, rather than only positive labels, to represent negative examples of relevance. The propagation system represents distance between documents in feature space as $d: \chi \times \chi \rightarrow \mathbb{R}$, which assigns each pair of points $x_i$ and $x_j$ a distance $d(x_i, x_j)$, and represents a ranking function of the documents as $f: \chi \rightarrow \mathbb{R}$, which assigns to each point $x_i$ a ranking score $f_i$. The ranking function learning problem is to learn $f: \chi \rightarrow \mathbb{R}$ from a set of queries with the features $X = \{\chi_q\}$ and the labels $Y = \{\gamma_q\}$. The propagation system represents the limit of the relevance propagation by the following equation:

$$f^* = (1-a)(I-aS)^{-1} y \quad (4)$$

where f* represents the limit of the relevance, y represents the initial labels, and a represents a decay factor. Because it is computationally difficult to calculate the inverse of the normalized similarity matrix S, the propagation system approximates f* using a Taylor series expansion. The propagation system may represent the Taylor series expansion by the following equation:

$$f^* = (I - \alpha S)^{-1} y \quad (5)$$
$$= (I + \alpha S + \alpha^2 S^2 + \ldots) y$$
$$= y + \alpha S y + \alpha S(\alpha S y) + \ldots$$

The propagation system iteratively solves for f* until it converges on a solution or for a fixed number of iterations.

Once the relevances are propagated, the propagation labeled system may use the training data sets (query and labeled feature vectors) to train a ranking function. A ranking function may be implemented as a support vector machine, an adaptive boosting classifier, a neural network classifier, and so on. A support vector machine operates by finding a hyper-surface in the space of possible inputs. The hyper-surface attempts to split the positive examples from the negative examples by maximizing the distance between the nearest of the positive and negative examples to the hyper-surface. This allows for correct classification of data that is similar to but not identical to the training data. Various techniques can be used to train a support vector machine. One technique uses a sequential minimal optimization algorithm that breaks the large quadratic programming problem down into a series of small quadratic programming problems that can be solved analytically. (See Sequential Minimal Optimization, at http://research.microsoft.com/~jplatt/smo.html.)

Adaptive boosting is an iterative process that runs multiple tests on a collection of training data. Adaptive boosting transforms a weak learning algorithm (an algorithm that performs at a level only slightly better than chance) into a strong learning algorithm (an algorithm that displays a low error rate). The weak learning algorithm is run on different subsets of the training data. The algorithm concentrates more and more on those examples in which its predecessors tended to show mistakes. The algorithm corrects the errors made by earlier weak learners. The algorithm is adaptive because it adjusts to the error rates of its predecessors. Adaptive boosting combines rough and moderately inaccurate rules of thumb to create a high-performance algorithm. Adaptive boosting combines the results of each separately run test into a single, very accurate classifier.

A neural network model has three major components: architecture, cost function, and search algorithm. The architecture defines the functional form relating the inputs to the outputs (in terms of network topology, unit connectivity, and activation functions). The search in weight space for a set of weights that minimizes the objective function is the training process. A neural network model may use a radial basis function ("RBF") network and a standard gradient descent as its search technique.

FIG. 1 is a diagram that illustrates a graph of documents returned as the search result of a query. In this example, subgraph 100 represents a portion of the documents returned in the search result. Nodes 101-112 represent 12 documents of the search result. Nodes 101 and 106 represent labeled documents. The document represented by node 101 has been labeled with the relevance score of 0.75, and the document represented by node 106 has been labeled with the relevance score of 0.6. The propagation system generated the edges between the nodes using a nearest neighbor algorithm. In this example, nodes 102, 103, and 104 are each one of the k-nearest neighbors to node 101, but nodes 105-112 are not one of the k-nearest neighbors. The propagation system then calculated the similarity between connected nodes using a similarity score algorithm. For example, node 101 is connected to node 102 with an edge with the weight of 0.8, which indicates the similarity between the connected nodes.

Figure 2:
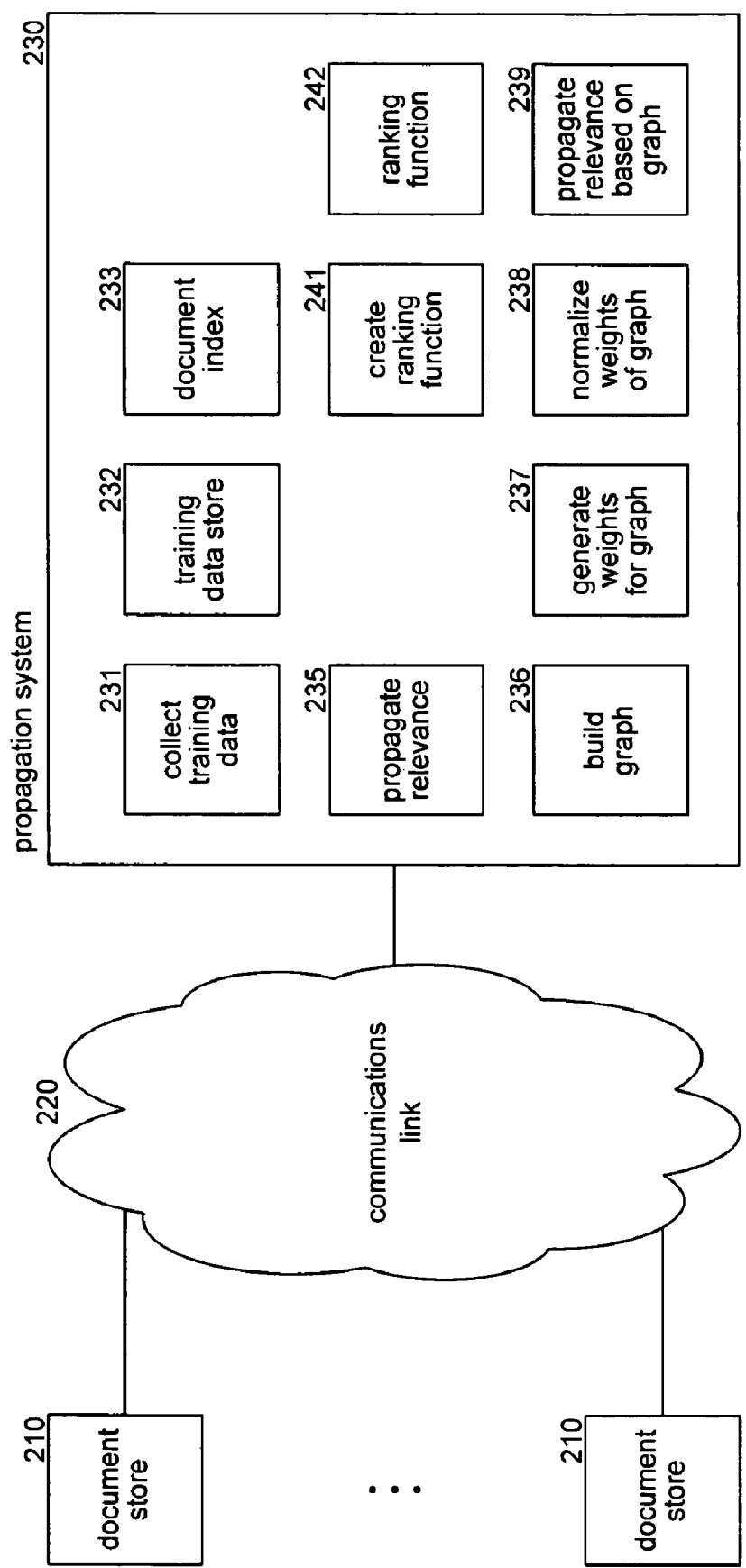
FIG. 2 is a block diagram that illustrates components of the propagation system in one embodiment.

FIG. 2 is a block diagram that illustrates components of the propagation system in one embodiment. The propagation system 230 is connected to document stores 210 (e.g., web sites) via communications link 220 (e.g., Internet). The propagation system includes a collect training data component 231, a training data store 232, and a document index 233. The document index contains an index of documents (e.g., web pages) in the document stores. The document index may be generated by a web crawler. The document index may include a feature vector for each document that is used for training a ranking function. The feature vectors may represent many different types of features of documents such as inverse document frequency, keywords, font size, and so on. The collect training data component submits queries to a search engine (not shown), and receives documents that match the queries. The search engine may be independent of the propagation system. In such a case, the propagation system may generate feature vectors dynamically from search results. The collect training data component may prompt a user to label the relevance of some of the documents that match the queries. The collect training data component stores the queries, search results (e.g., feature vectors), and labels in the training data store. The propagation system also includes a propagate relevance component 235, a build graph component 236, a generate weights for graph component 237, a normalize weights of graph component 238, and a propagate relevance based on graph component 239. The propagate relevance component propagates the relevance of the labeled documents to the unlabeled documents that are stored in the training data store. The propagate relevance component invokes the build graph component to build a graph including edges representing the documents of a search result. The propagate relevance component then invokes the generate weights for graph component to generate the initial weights for the edges of the graph. The propagate relevance component invokes the normalize weights of graph component to normalize the generated weights. The propagate relevance component then invokes the propagate relevance based on graph component to perform the actual propagation of the relevance from the labeled documents to the unlabeled documents. The propagation system also includes a create ranking function component 241 and a ranking function 242. The create ranking function uses the training data with the propagated relevance to create a ranking function.

The computing devices on which the propagation system may be implemented may include a central processing unit, memory, input devices (e.g., keyboard and pointing devices), output devices (e.g., display devices), and storage devices (e.g., disk drives). The memory and storage devices are computer-readable media that may contain instructions that implement the propagation system. In addition, the data structures and message structures may be stored or transmitted via a data transmission medium, such as a signal on a communications link. Various communications links may be used, such as the Internet, a local area network, a wide area network, or a point-to-point dial-up connection.

The propagation system may provide services to various computing systems or devices including personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The propagation system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 3:
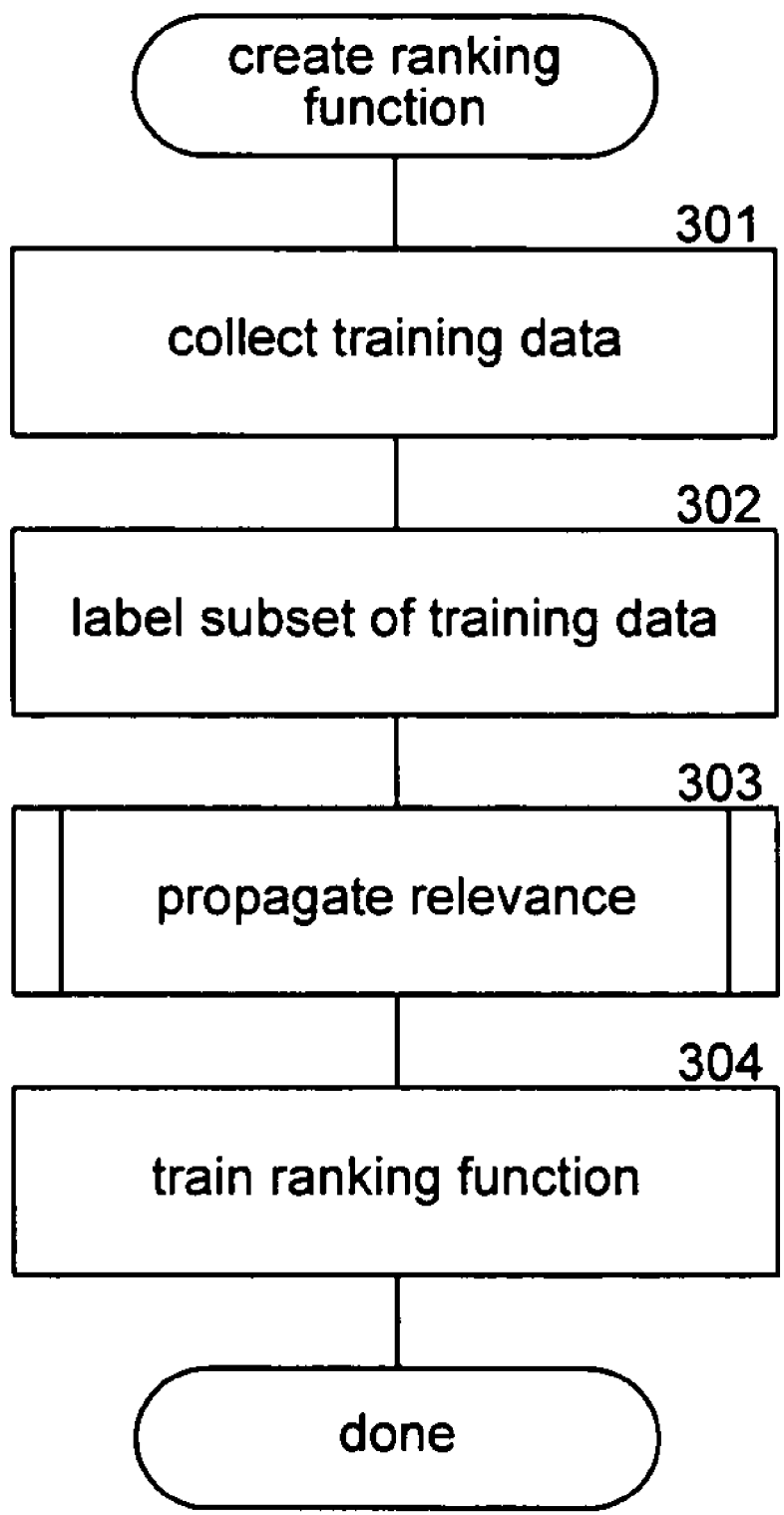
FIG. 3 is a flow diagram that illustrates the processing of the create ranking function component of the propagation system in one embodiment.

FIG. 3 is a flow diagram that illustrates the processing of the create ranking function component of the propagation system in one embodiment. The create ranking function component collects training data, propagates the relevance of labeled documents to unlabeled documents, and then trains a ranking function. In block 301, the component collects the training data. In block 302, the component inputs labels for a subset of the training data. In block 303, the component invokes the propagate relevance component to propagate the relevance of the labeled documents to the unlabeled documents. In block 304, the component trains the ranking function using the propagated relevances.

Figure 4:
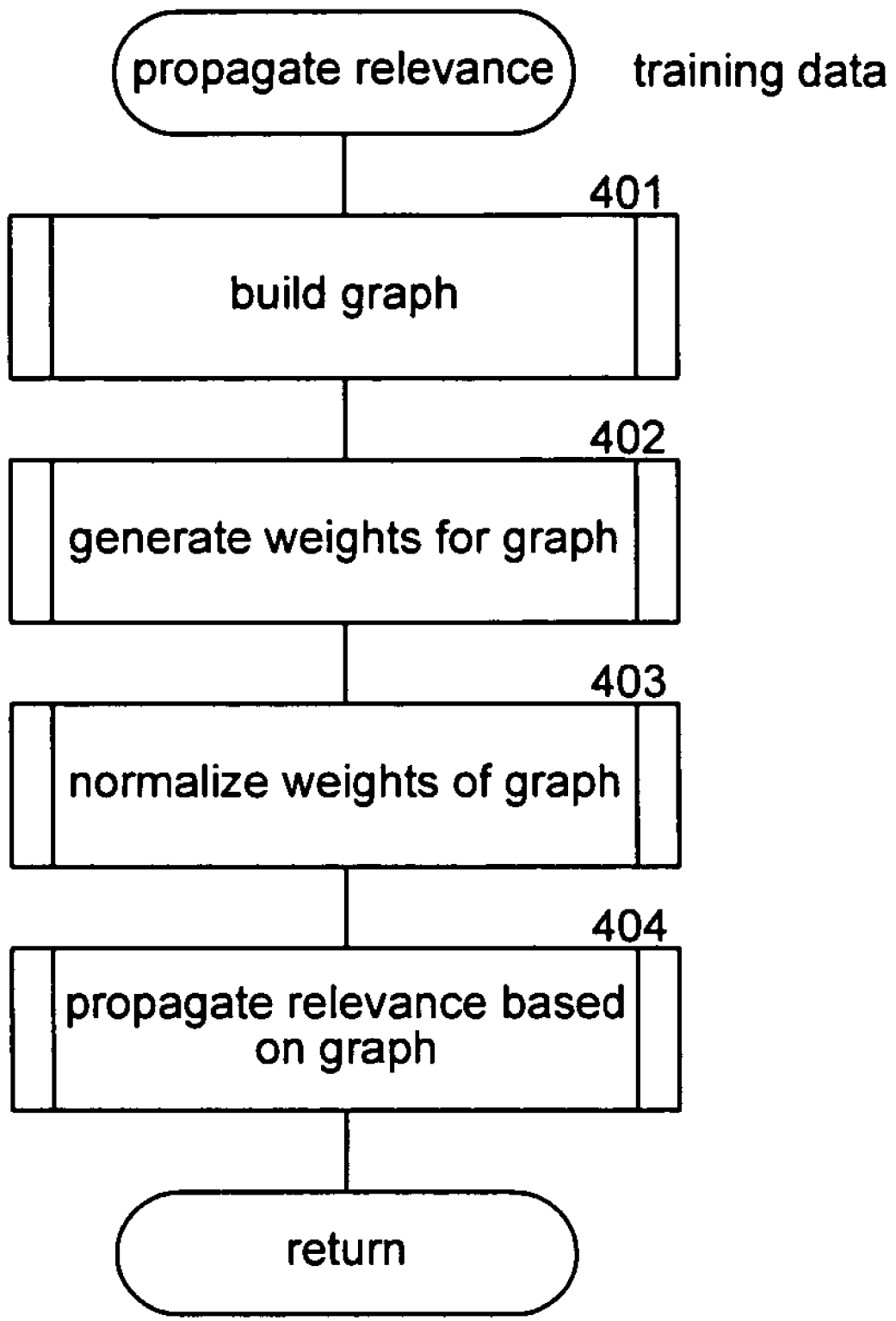
FIG. 4 is a flow diagram that illustrates the processing of the propagate relevance component of the propagation system in one embodiment.

FIG. 4 is a flow diagram that illustrates the processing of the propagate relevance component of the propagation system in one embodiment. The component is provided training data and propagates the relevance of the labeled documents to the unlabeled documents. In block 401, the component invokes the build graph component to build the initial graph that includes edges. In block 402, the component invokes the generate weights for graph component to generate weights indicating the similarity between documents represented by connected nodes. In block 403, the component invokes the normalize weights of graph component to normalize the weights of the graph. In block 404, the component invokes the propagate relevance based on graph component to perform the propagation of the relevance. The component then returns.

Figure 5:
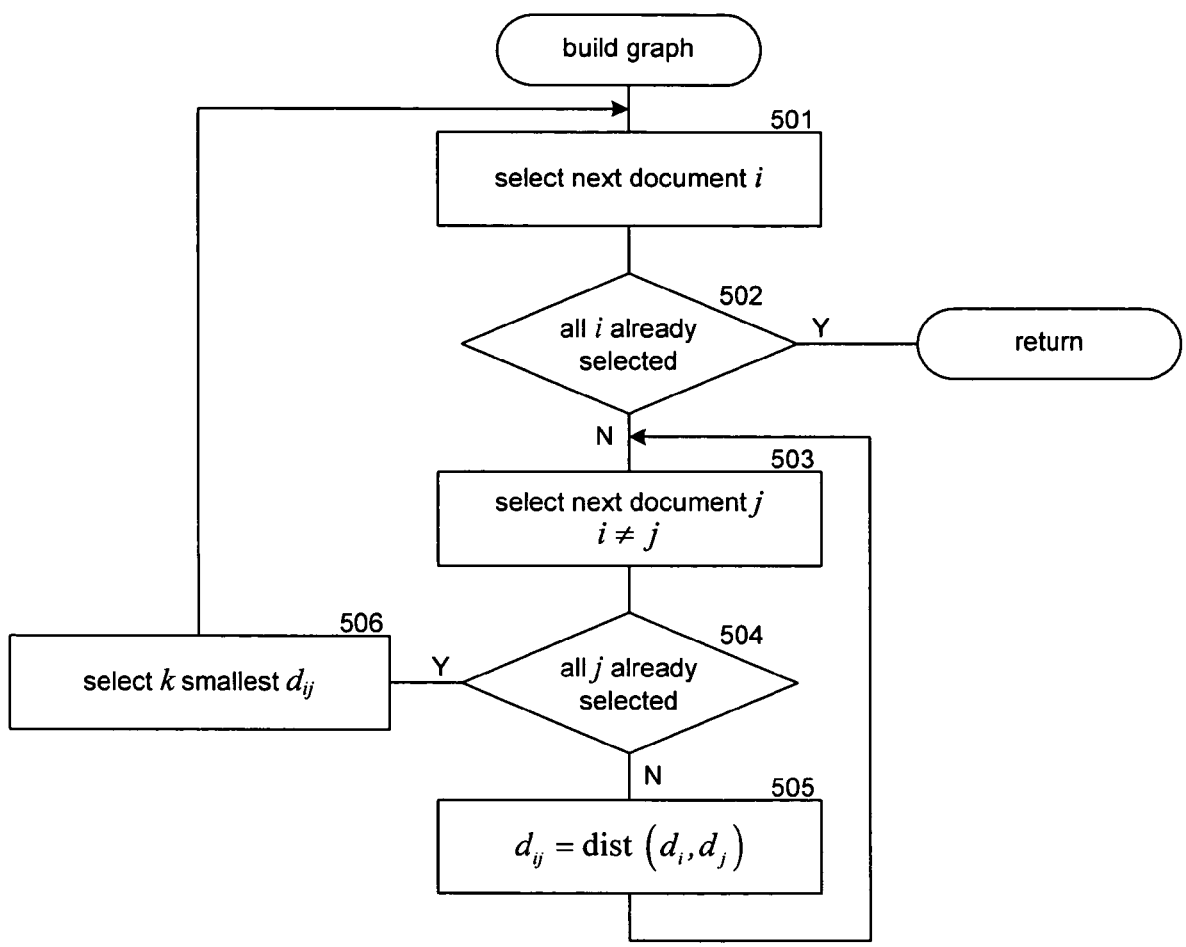
FIG. 5 is a flow diagram that illustrates the processing of the build graph component of the propagation system in one embodiment.

FIG. 5 is a flow diagram that illustrates the processing of the build graph component of the propagation system in one embodiment. The component creates a square matrix with each row and column representing a document. The component then identifies and adds a connection between each node and its k-nearest neighbors (e.g., k=10). In block 501, the component selects the next document i. In decision block 502, if all the documents i have already been selected, then the component returns, else the component continues at block 503. In block 503, the component selects the next document j. In decision block 504, if all the documents j for the selected document i have already been selected, then the component continues at block 506, else the component continues at block 505. In block 505, the component calculates the distance between the selected document i and the selected document j and then loops to block 503 to select the next document j. In block 506, the component selects the 10 documents j with the smallest distance for a document i (i.e., the nearest neighbors) and then loops to block 501 to select the next document i.

Figure 6:
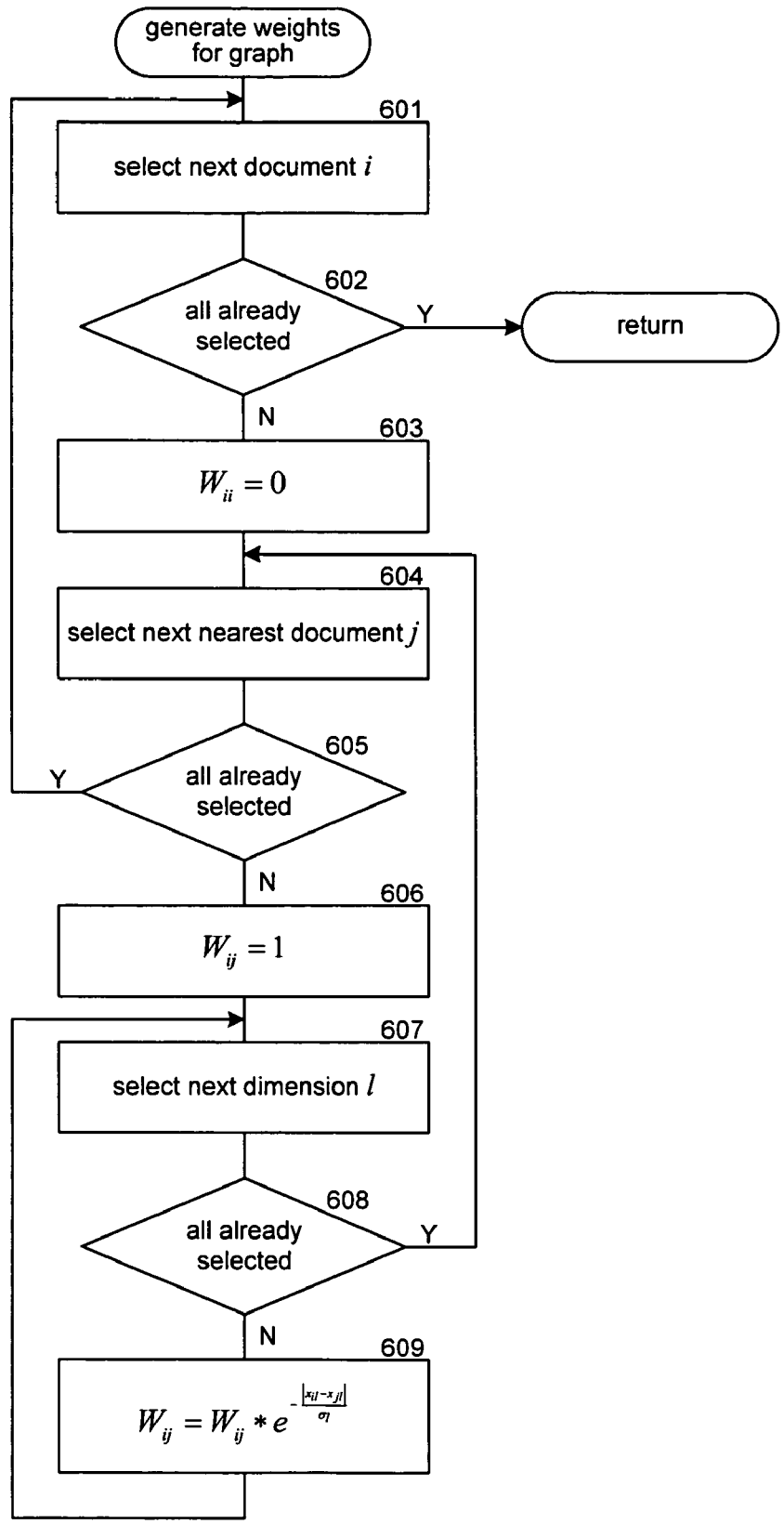
FIG. 6 is a flow diagram that illustrates the processing of the generate weights for graph component of the propagation system in one embodiment.

FIG. 6 is a flow diagram that illustrates the processing of the generate weights for graph component of the propagation system in one embodiment. The component calculates the similarity between connected documents based on a Manhattan metric. In block 601, the component selects the next document i. In decision block 602, if all the documents i have already been selected, then the component returns, else the component continues at block 603. In block 603, the component initializes the similarity of the document to itself to 0. In block 604, the component selects the next nearest document j (i.e., a connected document) to the selected document i. In decision block 605, if all the nearest documents j to the selected document i have already been selected, then the component loops to block 601 to select the next document i, else the component continues at block 606. In block 606, the component initializes the similarity between the selected document i and the selected document j to 1. In blocks 607-609, the component loops calculating the distance metric. In block 607, the component selects the next dimension l of the feature vector. In decision block 608, if all the dimensions have already been selected, then the component loops to block 604 to select the next nearest document j, else the component continues at block 609. In block 609, the component sets the similarity between the selected document i and the selected document j to its current similarity multiplied by a function of the difference between the selected feature l of the selected document i and the selected document j in accordance with Equation 2. The component then loops to block 607 to select the next dimension.

Figure 7:
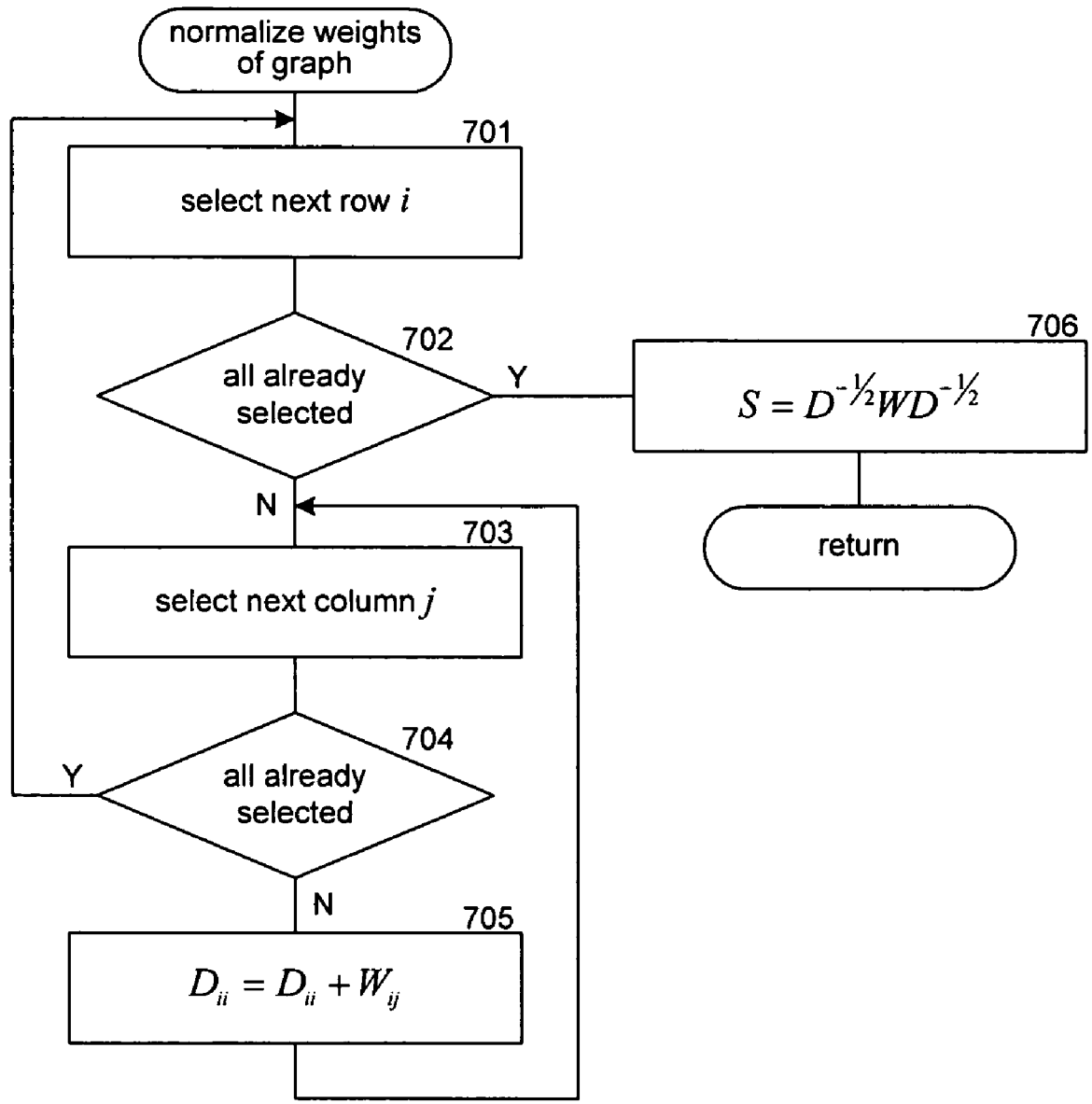
FIG. 7 is a flow diagram that illustrates the processing of the normalize weights of graph component of the propagation system in one embodiment.

FIG. 7 is a flow diagram that illustrates the processing of the normalize weights of graph component of the propagation system in one embodiment. The component normalizes the weights of the similarity matrix. In block 701, the component selects the next row i of the similarity matrix. In decision block 702, if all the rows have already been selected, then the component continues at block 706, else the component continues at block 703. In blocks 703-705, the component calculates the value for the diagonal matrix D for the selected row. In block 703 the component selects the next column j of the similarity matrix. In decision block 704, if all the columns have already been selected, then the component loops to block 701 to select the next row, else the component continues at block 705. In block 705, the component adds the weights of the selected row i and the selected column j to the diagonal element for the selected row i. The component then loops to block 703 to select the next column j for the selected row i. In block 706, the component normalizes the similarity matrix in accordance with Equation 3.

Figure 8:
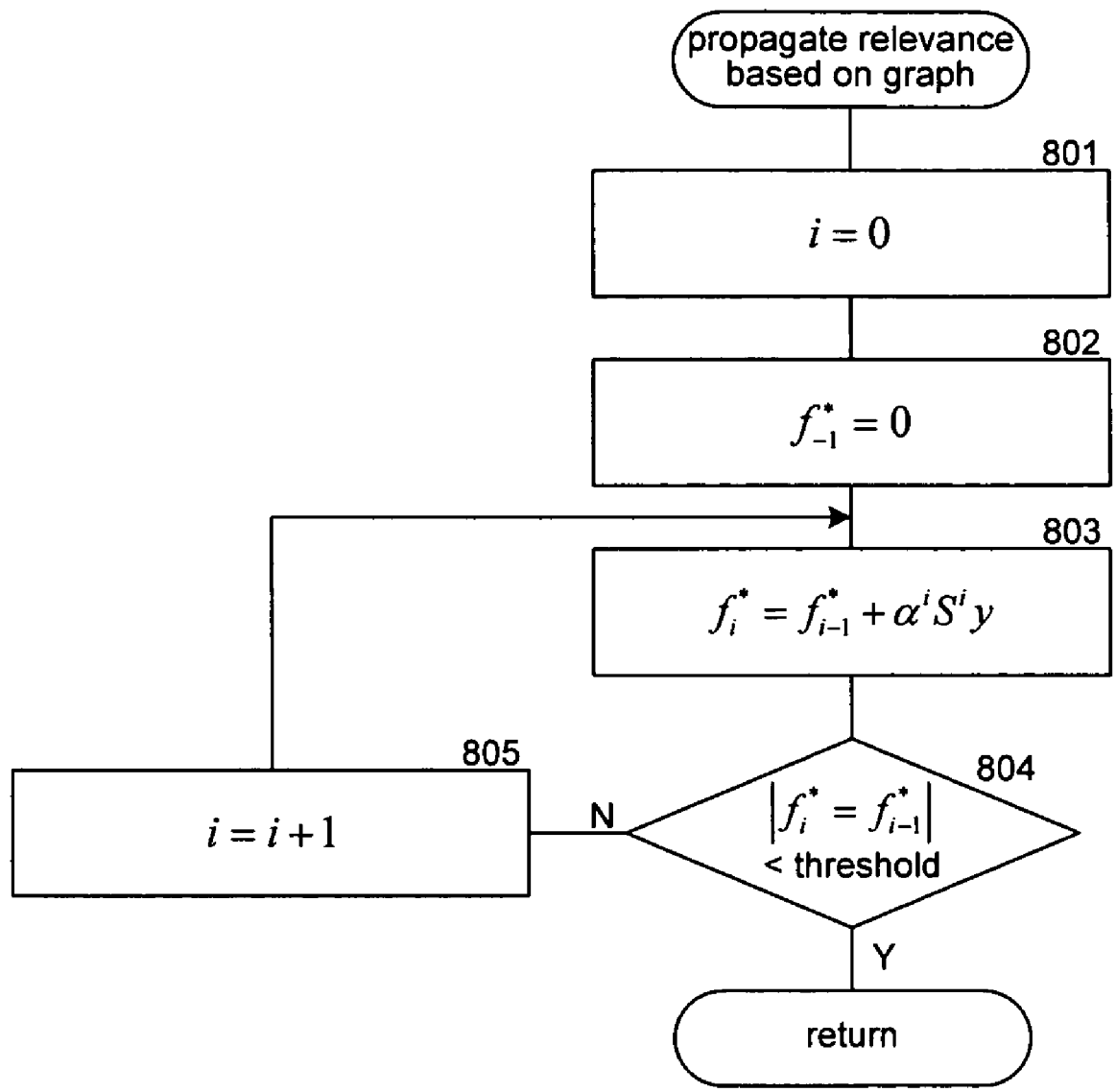
FIG. 8 is a flow diagram that illustrates the processing of the propagate relevance based on graph component of the propagation system in one embodiment.

FIG. 8 is a flow diagram that illustrates the processing of the propagate relevance based on graph component of the propagation system in one embodiment. The component iteratively calculates the Taylor series expansion of Equation 5 until it converges on a solution. In block 801, the component initializes index i to zero. In block 802, the component initializes the solution vector to 0. In blocks 803-805, the component loops until it converges on a solution. In block 803, the component calculates the value for the next iteration based on the value of the previous iteration plus the next factor of the Taylor series expansion. In decision block 804, if the values converge on a solution, then the component returns, else the component continues at block 805. In block 805, the component increments the index to the next iteration and loops to block 803 to perform the next iteration.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. The propagation system may be used to augment search results. For example, a search engine may generate a search result based on a certain corpus of documents. The relevance of the documents of the search result can then be propagated to documents of a different corpus using the propagation system. The documents of the different corpus with the highest relevance can then be added to the search result. The propagation system may be used to propagate relevance from documents labeled with their relevance to a single query to unlabeled documents (intra-query propagation) or from documents labeled with their relevance to multiple queries to unlabeled documents (inter-query propagation). The propagation component trains the training component separately for each query with intra-query propagation and simultaneously for multiple queries with inter-query propagation. Accordingly, the invention is not limited except as by the appended claims.

We claim:

1. A computing device with a processor and memory for training a document ranking component, comprising:
   a training data store that contains training data including representations of documents and, for each query of a plurality of queries, a labeling of some of the documents with relevance of the documents to the query;
   a graph component that creates a graph of the documents with the documents represented as nodes being connected by edges representing similarity between documents including
      a build graph component that builds a graph in which nodes representing similar documents are connected via edges, such that each node has an edge to a number of other nodes that are most similar to it; and
      a generate weights component that generates weights for the edges based on similarity of the documents represented by the connected nodes, each document being represented by a feature vector in a feature space, the similarity between two documents being calculated based on a metric derived from the feature vectors representing the two documents; and
   a propagate relevance component that propagates relevance of the labeled documents to the unlabeled documents based on similarity between documents as indicated by the weights generated for the edges;
   a training component that trains a document ranking component to rank relevance of documents to queries based on the propagated relevance of the documents of the training data; and
   a search component that, after the document ranking component is trained, receives a query, identifies documents relating to the query, and ranks the identified documents using the document ranking component that was trained based on the propagated relevance of the documents of the training data
   wherein the components comprise computer-executable instructions stored in memory for execution by the processor.

2. The computing device of claim 1 wherein the document ranking component implements a classification algorithm selected from a group consisting of a neural network algorithm, an adaptive boosting algorithm, and a support vector machine algorithm.

3. The computing device of claim 1 wherein the document ranking component implements a regression based algorithm.

4. The computing device of claim 1 wherein the propagate relevance component propagates relevance separately for each query and the training component trains the document ranking component using the separately propagated relevances.

5. The computing device of claim 1 wherein the build graph component establishes edges between nodes using a nearest neighbor algorithm.

6. The computing device of claim 1 wherein the propagate relevance component propagates relevance using a manifold ranking based algorithm.

7. The computing device of claim 1 wherein the component that generates weights for the edges calculates similarity according to the following:

$$W_{ij} = \prod_{l=1}^{t} \exp(-|x_{il} - x_{jl}|/\sigma_l)$$

where $W_{ij}$ represents the similarity between documents i and j, $x_{il}$ and $x_{jl}$ represent the $l^{th}$ dimension of the feature vectors $x_i$ and $x_j$ respectively, t represents the dimensionality of the feature space, and $\sigma_l$ represents a positive parameter that reflects the weights of different dimensions in the calculating of similarity.

8. A computer-readable storage medium containing instructions for controlling a computer system to train a document ranking component, by a method comprising:

providing representations of documents along with a labeling of some of the documents that indicates relevance of a document to a query;

creating a graph with the documents represented as nodes being connected by edges representing similarity between documents represented by the connected nodes, each document being represented by a feature vector in a feature space, the similarity between documents being calculated based on a metric derived from the feature vectors representing the documents;

propagating relevance of the labeled documents to the unlabeled documents based on similarity between documents as indicated by the created graph and based on a manifold ranking based algorithm; and training a document ranking component to rank relevance of documents to queries based on the propagated relevance of the documents;

wherein after the document ranking component is trained based on the propagated relevance, the document ranking component is adapted to rank documents of search results of a query.

9. The computer-readable storage medium of claim 8 wherein the document ranking component implements a classification algorithm selected from a group consisting of a Bayes net algorithm, an adaptive boosting algorithm, and a support vector machine algorithm.

10. The computer-readable storage medium of claim 8 wherein the document ranking component implements a regression based ranking algorithm.

11. The computer-readable storage medium of claim 8 wherein the propagating of the relevance propagates relevance separately for each query and the training of the document ranking component trains using the separately propagated relevance.

12. The computer-readable storage medium of claim 8 wherein the creating of a graph includes:

building a graph in which nodes representing similar documents are connected via edges; and generating weights for the edges based on similarity of the documents represented by the connected nodes.

13. The computer-readable storage medium of claim 8 wherein the metric is a Euclidean distance.

14. The computer-readable storage medium of claim 8 wherein the metric is a cosine similarity metric.

15. A computing device with a processor and memory for training a document ranking component, comprising:

a component that provides representations of documents along with a labeling of some of the documents, the labeling for a document indicating relevance of that document to a query;

a component that determines the similarity between pairs of documents represented based on analysis of content of each pair of documents;

a component that propagates the relevance of labels of the labeled documents to the unlabeled documents based on the determined similarity between documents such that the propagation of the relevance of a label document to an unlabeled document increases with increasing similarity between the labeled document and the unlabeled document; and a component that generates a document ranking component to rank relevance of documents to a query based on the propagated relevance of the documents so that, after the document ranking component is generated, the document ranking component is adapted to rank documents of search results of a query.

16. The computing device of claim 15 wherein the document ranking component implements a regression based ranking algorithm.

17. The computing device of claim 15 wherein the component that propagates relevance propagates relevance based on a manifold ranking based algorithm.

18. The computing device of claim 15 wherein the labeled documents represent documents that are search results of the query provided based on searching a first corpus of documents and the unlabeled documents represent documents of a second corpus of documents and including a component that adds to the search results documents of the second corpus based on their propagated relevance to the query.

* * * * *